United States Patent [19]

Kubo et al.

[11] Patent Number: 5,315,373
[45] Date of Patent: May 24, 1994

[54] METHOD OF MEASURING A MINUTE DISPLACEMENT

[75] Inventors: Keishi Kubo, Moriguchi; Yoshihiro Ikemoto, Katano; Tatsuo Itou, Osaka, all of Japan

[73] Assignee: Matsushita Electric Industrial Co., Ltd., Osaka, Japan

[21] Appl. No.: 904,730

[22] Filed: Jun. 26, 1992

[30] Foreign Application Priority Data

Jun. 28, 1991 [JP] Japan .................. 3-157268

[51] Int. Cl.$^5$ .................. G01B 7/34; G01B 11/30
[52] U.S. Cl. .................. 356/373; 73/105; 356/376
[58] Field of Search .............. 356/371, 375, 376, 373; 73/105

[56] References Cited

U.S. PATENT DOCUMENTS 4,017,188  4/1977  Sawatari .................. 356/371
5,067,817  11/1991  Glenn .................. 356/376

Primary Examiner—Richard A. Rosenberger
Attorney, Agent, or Firm—Wenderoth, Lind & Ponack

[57] ABSTRACT

A method for detecting a minute displacement of a probe includes an emission from a light source of two light beams having different polarizing directions. The light beams are subsequently diverged by a first lens so as to pass through a beam splitter towards a separating prism. The light beams having passed through the prism are separated into first and second measuring beams which are subsequently focused by a second lens on first and second, spaced reflecting surfaces. The first and second measuring beams are then reflected by the first and second reflecting surfaces, respectively, so as to enter respective photodetectors after having passed through the separating prism, the beam splitter and a polarizing beam splitter for passing therethrough the first and second measuring beams or reflecting them depending on the polarizing direction of the incoming light. The first and second photodetectors outputs respective signals indicative of the associated positions of foci which are then processed by a signal processing circuit to provide an indication of the minute displacement of the probe.

2 Claims, 4 Drawing Sheets

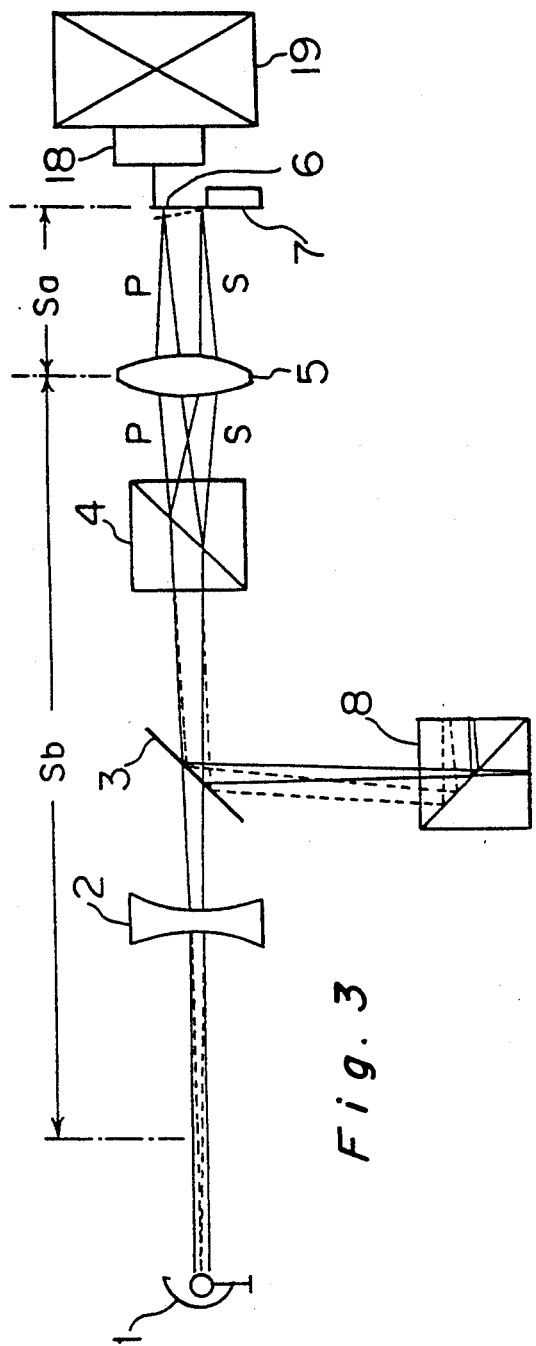
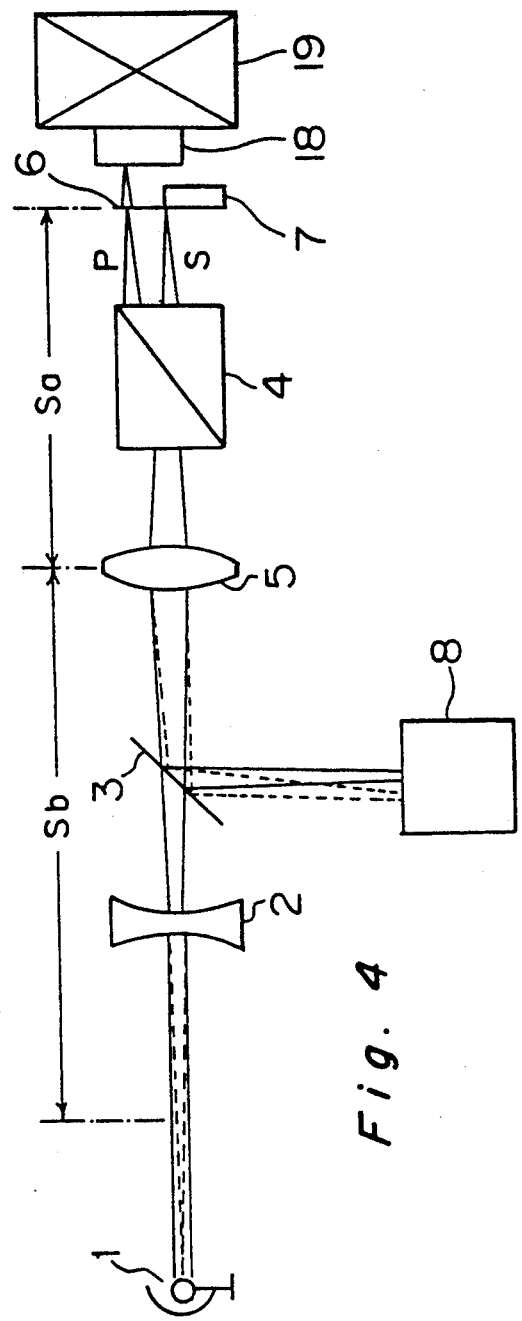
Fig. 3
Fig. 4

METHOD OF MEASURING A MINUTE DISPLACEMENT

BACKGROUND OF THE INVENTION

1. Field of the Invention

The present invention relates to a displacement measuring method for measuring a minute displacement of a probe in a quantity on the order of a nanometer or smaller which has resulted from a change in atomic force acting between the probe and a sample. More specifically, the present invention relates to a displacement measuring method suited for the detection of a surface profile of or surface indents appearing on a surface of an article such as, for example, an integrated circuit board.

2. Description of the Prior Art

The prior art minute displacement measuring method utilized in an AFM (atomic force microscope) system for the measurement of the minute surface profile of a sample comprises a detection of a deformation of a probe mounted on a cantilevered elastic beam and disposed in the close vicinity of a surface of the sample to be measured. The deformation of the probe is a function of the atomic force acting between the probe and the surface of the sample to be measured. Then, by varying the position of the sample in a transverse direction perpendicular to the probe while the atomic force so detected is maintained at a predetermined value, the surface profile of the sample is measured by moving the surface of the sample along a plane perpendicular to said transverse direction while the spacing between the to-be-measured surface and the probe is precisely kept at a predetermined distance on the order of a nanometer to a subangstrom.

The prior art minute displacement measuring method referred to above will now be discussed in detail with reference to FIG. 5. The system shown therein includes a laser source 1 designed to emit linearly polarized beams P and S having respective P- and S-polarizing directions inclined at an angle of 45 degrees relative to a plane of the sheet of FIG. 5. These linearly polarized beams travel through a beam splitter 3 towards a Wallaston's prism 4. The rays of light incident on the Wallaston's prism 4 are then separated in two directions corresponding to the P- and S-polarizing directions. In the illustrated example, the linearly polarized beam P in the P-polarizing direction is separated upwards as a measuring beam P while the linearly polarized beam S in the S-polarizing direction is separated downwards as a measuring beam S.

The measuring beam P is, as it pass through a lens 5, converged at point adjacent the tip of the displacement measuring probe 6 and is then reflected backwards so as to travel again towards the Wallaston's prism 4 through the lens 5. The reflected measuring beam P reflected from the probe 6 and having subsequently passed through the prism 4 again enters the beam splitter 3 and is subsequently deflected so as to travel towards a prism 8. This prism 8 is either a light transmissive type or a reflecting type depending on the direction of polarization of the light.

The measuring beam P emerging from the prism 8 enters a photodetector 9 by which the focal position of the measuring beam P is detected. In FIG. 5, the measuring beam P shown by the solid line represents that before a displacement of the probe 6 and the measuring beam P shown by the phantom line represents that after the displacement of the probe 6. Therefore, if the focal position of the measuring beam P is displaced upwards as viewed in FIG. 5, an output signal from an upper terminal of the photodetector 9 indicative of the focal position will be of a level higher than an output from a lower terminal of the photodetector 9, and vice versa.

The output signal indicative of the focal position of the measuring beam P outputted from the photodetector 9 is then processed by a signal processing circuit, including a subtractor 11, an adder 13 and a divider 15, so as not to be affected by a change in signal intensity of the light source and is then converted into an electrical signal.

On the other hand, the measuring beam S is converged by the lens 5 at a point adjacent a probe holder 7 for the support of the probe 6 and is subsequently reflected therefrom. The reflected measuring beam S is then passed through lens 5 so as to travel towards the prism 4. The measuring beam S deflected by the prism 4 so as to enter the beam splitter 3 by which the measuring beam S is reflected so as to travel towards the prism 8. As the measuring beam S enters the prism 8, the measuring beam S is allowed to pass through or reflected by the prism 8 depending on the direction of polarization as is the case with the measuring beam P described above.

The measuring beam S emerging from the prism 8 is subsequently detected by the photodetector 10 to determine the focal position of the measuring beam S in a manner similar to the detection of the focal position of the measuring beam P described above.

The output signal indicative of the focal position of the measuring beam S outputted from the photodetector 10 is then processed by a signal processing circuit, including a subtractor 12, an adder 14 and a divider 16, so as not to be affected by a change in signal intensity of the light source and is then converted into an electrical signal.

In the foregoing prior art method, the photodetector 9 provides a composite output comprises of a signal indicative of a change in angle resulting from the displacement of the probe 6, a noise signal resulting from a swaying motion of air and a noise signal resulting from a vibration of the optical system. On the other hand, the photodetector 10 provides a composite output comprises of a noise signal resulting from a swaying motion of air and a noise signal resulting from a vibration of the optical system.

Accordingly, if the composite signal from the photodetector 10 is subtracted by a subtractor 17 from the composite signal from the photodetector 9, it is clear that the signal substantially faithfully indicative of the minute displacement of the probe 6, which is not affected by the swaying motion of air and the vibration in the optical system, can be obtained.

Thus, by varying the position of the sample 18 in a transverse direction perpendicular to the probe 6 by means of an XYZ scanner 19 supporting the sample 18 while the displacement signal so obtained is maintained at a predetermined constant value, the surface profile of the sample 18 can be measured by moving the surface of the sample 18 along a plane perpendicular to said transverse direction while the spacing between the sample 18 and the probe 6 is kept at a distance on the order of a nanometer to a subangstrom.

In the prior art method, however, it is not possible to converge and focus the measuring beams P and S at the probe 6 and the photodetectors 9 and 10 simultaneously and, therefore, when the measuring beams P and S are converged and focused on the probe 6, the measuring beams P and S cannot be converged and focused on the photodetectors and, therefore, the detecting sensitivity to the displacement of the probe is lowered. On the other hand, when the measuring beams are focused on the photodetectors, the measuring beams cannot be focused on the probe 6 and, therefore, where the probe 6 is in the form of a minute probe formed by the use of a process such as, for example, a semiconductor lithography, the spot size of the measuring beams becomes larger than the width of the minute probe with a portion of the light falling on the sample, which portion is, after having been scattered from the sample, converged again by the lens 5 so as to fall on the photodetectors 9 and 10 with the consequence that this signal eventually overlaps a normal signal as a ghost signal. Therefore, a signal indicating as if the probe 6 is located at a position different from the position to which it has actually been displaced is outputted, resulting in an error in measurement.

SUMMARY OF THE INVENTION

The present invention has been devised with a view to substantially eliminating the above discussed problems inherent in the prior art method and is intended to provide an improved minute displacement measuring method wherein the measuring beams can be converged and focused on the probe and the photodetectors simultaneously to accomplish a highly precise measurement of a minute displacement of the probe.

To this end, the minute displacement measuring method of the present invention comprises an emission from a light source of two light beams having different polarizing directions. The light beams are subsequently converged and then dispersed by a lens so as to pass through a beam splitter towards a separating prism having an angle of separation which is variable depending on the polarizing direction of the light. Thus, the light beams having passed through the prism are separated into first and second measuring beams which are subsequently focused by a different lens on a first reflecting surface, disposed in the vicinity of the tip of the probe, and a second reflecting surface disposed in the vicinity of the probe holder.

The first and second measuring beams are then reflected by the first and second reflecting surfaces, respectively, so as to travel through the different lens towards the separating prism. The measuring beams having passed through the separating prism are again passed through the beam splitter by which they are deflected in a direction different from the direction towards the light source, and are subsequently allowed to enter a polarizing beam splitter for passing therethrough the first and second measuring beams or reflecting them depending on the polarizing direction of the incoming light. The first and second measuring beams separated by the polarizing prism subsequently enter first and second photodetectors providing respective signals indicative of the associated positions of foci which are then processed by a signal processing circuit to provide an indication of the minute displacement of the probe.

According to another embodiment of the present invention, the minute displacement measuring method of the present invention comprises an emission from a light source of two light beams having different polarizing directions. The light beams are subsequently converged and then dispersed by a lens so as to pass through a beam splitter towards a separating prism having an angle of separation which is variable depending on the direction of polarization of the light. The light beams having passed through the lens and the prism are separated into first and second measuring beams which are subsequently focused on a first reflecting surface, disposed in the vicinity of the tip of the probe, and a second reflecting surface disposed in the vicinity of the probe holder.

The first and second measuring beams are then reflected by the first and second reflecting surfaces, respectively, so as to travel through the prism and the lens towards the beam splitter. The measuring beams having entered are deflected in a direction different from the direction towards the light source, and are subsequently allowed to enter a polarizing beam splitter for passing therethrough the first and second measuring beams or reflecting them depending on the polarizing direction of the incoming light. The first and second measuring beams separated by the polarizing prism subsequently enter first and second photodetectors providing respective signals indicative of the associated positions of foci which are then processed by a signal processing circuit to provide an indication of the minute displacement of the probe.

In the practice of the present invention, in place of the lens for converging the rays of light emitted from the light source, a lens for diverging the rays of light from the light source may be employed.

Thus, according to the present invention, the measuring beams from the light source are passed through the lens so that the light beams can be diverged from a focal point of the lens, and the diverged beams are, after having passed through an optical system, focused by the different lens on the probe. The beams focused on the probe are then reflected therefrom and, according to the principle of reverse travel of light, travel backwards through the different lens and the optical. The beams having travelled backwards from the probe can be focused on the photodetectors because of the photodetectors being positioned at respective location corresponding to the focal point of the first mentioned lens.

Accordingly, even though the minute probe manufactured by the use of a process such as, for example, a semiconductor lithography is employed, the spot size of each of the measuring beams falling on the probe can be minimized with no possibility of the beam partly falling on the sample and, therefore, no ghost signal which would constitute a cause of the error in measurement will be generated. Also, since the spot size of each beam falling on the associated photodetector can be throttled down to a value corresponding to the diffraction limit, the accuracy of positioning of the measuring beams on the photodetectors can be improved. As discussed above, since the cause of the possible error in measurement is eliminated and the positioning accuracy is high, the minute displacement of the probe can be highly accurately measured.

If the lens (convex lens) for converging the rays of light from the light source is replaced by the lens (concave lens) for diverging the rays of light from the light source, the focal point on the side adjacent the light source of the measuring beams shifts from a side of the concave lens adjacent the sample to the opposite side adjacent the light source and, therefore, the optical system as a whole can be reduced in size.

BRIEF DESCRIPTION OF THE DRAWINGS

This and other objects and features of the present invention will become readily understood from the following description of preferred embodiments taken with reference to the accompanying drawings, in which like parts are designated by like reference numerals and in which:

FIGS. 2 to 4 are diagrams similar to FIG. 1 showing second to fourth embodiments of the present invention, respectively.

DETAILED DESCRIPTION OF THE EMBODIMENTS

Figure 1:
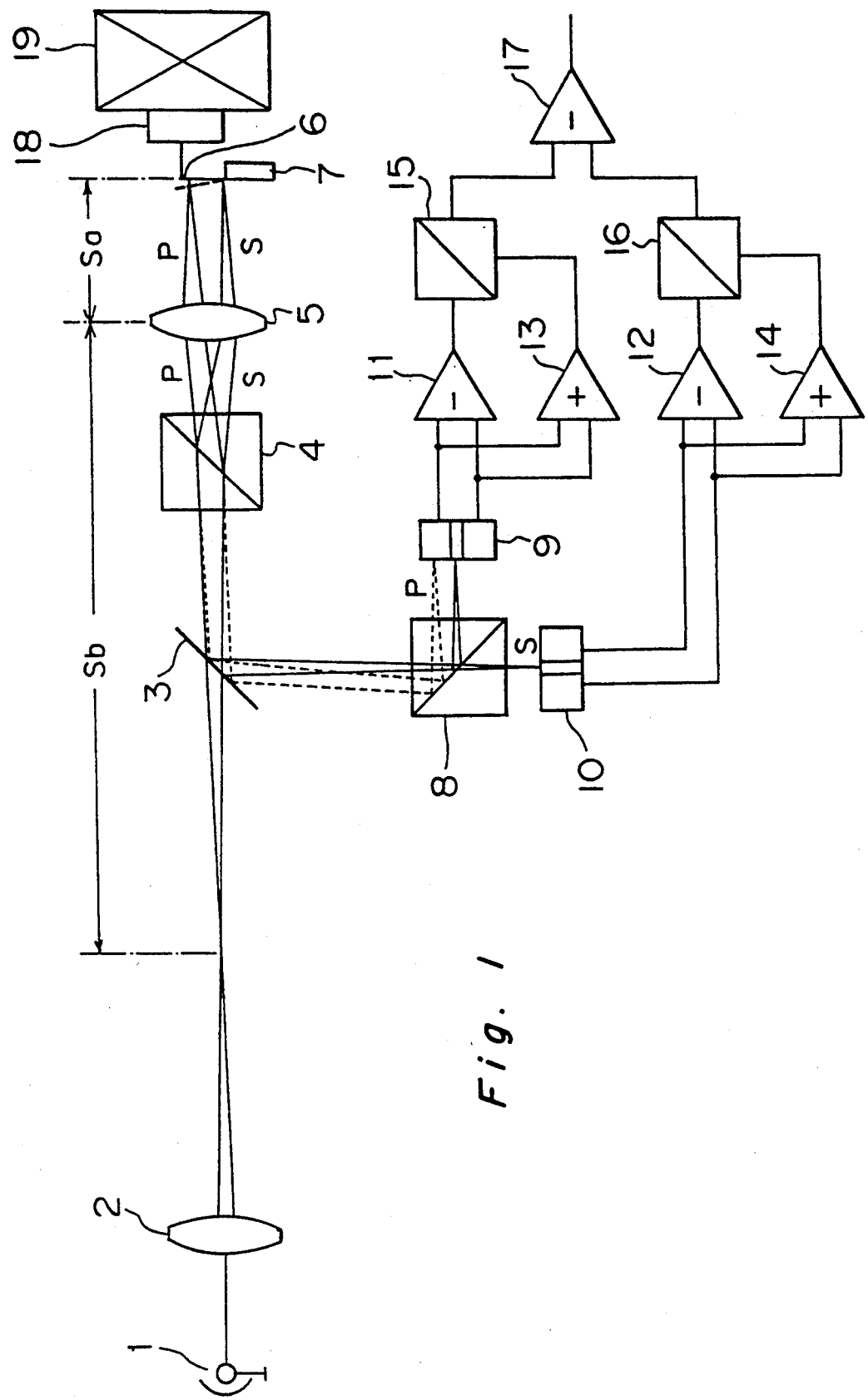
FIG. 1 is a schematic diagram showing the principle of operation of a first embodiment of the present invention.

Referring first to FIG. 1, a light source 1, which may be a laser source, emits two beams of linearly polarized rays of light having respective polarizing directions (P- and S-polarizing directions) inclined at an angle of 45 degrees relative to a plane of the sheet depicting FIG. 1. These two beams emerging from the light source 1 are converged by a first convex lens 2 and are then diverged outwardly therefrom as respective measuring beams. The measuring beams emerging from the first convex lens 2 subsequently travel through a beam splitter 3 towards a Wallaston's prism (or calcite prism) 4 by which the measuring beams are separated in two respective directions corresponding to the P- and S-polarizing directions. As illustrated, the linearly polarized light in the P-polarizing direction is separated upwardly as the measuring beam P whereas the linearly polarized light in the S-polarizing direction is separated downwardly as the measuring beam S.

The measuring beam P is then passed through a second convex lens 5 so as to be converged at a point adjacent a tip of a displacement measuring probe 6 and is subsequently reflected therefrom. The measuring beam P so reflected travels backwards through the second convex lens 5 and the prism 4. Thereafter, the measuring beam P having passed through the prism 4 enters the beam splitter 3 by which it is deflected in a direction diverging from the direction towards the light source 1 so as to enter a polarizing beam splitter 8. This polarizing beam splitter 8 is operable to pass or reflect rays of light depending on the polarizing direction of light.

The measuring beam P entering the polarizing beam splitter 8 is deflected thereby so as to travel towards a first photodetector 9 so as to be focused thereon; the photodetector 9 may be either a two-division type or a one-dimensional position measuring type. This photodetector 9 upon receipt of the measuring beam P detects the position of the focus of the measuring beam P.

It is to be noted that, in FIG. 1, the measuring beam P shown by the solid line represents that before a displacement of the probe 6 and the measuring beam P shown by the phantom line represents that after the displacement of the probe 6. Therefore, if the position of the focus of the measuring beam P is displaced upwards as viewed in FIG. 1, an output signal from an upper terminal of the photodetector 9 indicative of the position of the focus will be of a level higher than an output from a lower terminal of the photodetector 9, and vice versa. It is also to be noted that, in FIG. 1, a displacement of the measuring beam P after the displacement of the probe 6 is exaggeratedly shown for the purpose of a better understanding and that, in practice, the displacement is very minute and the position of the focus of the measuring beam P after the displacement of the probe 6 extends over both sides of the photodetector where the latter is of the two-division type.

The focus position signal, that is, the signal indicative of the position of the focus of the measuring beam P, emitted from the photodetector 9 is calculated and converted into an electrical signal by a subtractor 11, an adder 13 and a divider 15 of the signal processing circuit so that it will not be affected by a change in signal intensity of the light source.

On the other hand, the measuring beam S is focused by the convex lens 5 so as to converge at a point adjacent a probe holder for the support of the probe 6. The measuring beam S so converged is reflected therefrom towards the beam splitter 3 by way of the convex lens 5 and the prism 4. The measuring beam S is then deflected by the beam splitter 3 in a direction diverging from the direction towards the light source 1 so as to pass through the polarizing beam splitter 8.

The measuring beam P having passed through the polarizing beam splitter 8 travels towards a second photodetector 10 so as to be focused thereon. This photodetector 10 upon receipt of the measuring beam S detects and provides a signal indicative of the position of the focus of the measuring beam S.

In such case, the various optical elements are so arranged and so disposed as satisfy the requirements expressed by the following equation (1) and, at the same time, the distance between the principal point of the second convex lens 5 and the first photodetector 9 and the distance between the principal point of the second convex lens 5 and the second photodetector 10 are equal to each other and also equal to the distance Sb.

$$Sb = (Sa \cdot f)/(Sa - f) \tag{1}$$

wherein Sa represents the distance between the principal point of the second convex lens 5 and the displacement measuring probe 6, Sb represents the distance between the principal point of the second convex lens 5 and the point at which the rays of light converged by the first convex lens 2 are focused, and f represents the focal length of the second convex lens 5.

With the various optical elements so arranged and so disposed as hereinabove described, it is clear that the respective foci of the measuring beams P and S are formed on the probe 6 and both of the first and second photodetectors 9 and 10.

Thereafter, the focus position signal, that is, the signal indicative of the position of the focus of the measuring beam S, emitted from the second photodetector 10 is calculated and converted into an electrical signal by a subtractor 12, an adder 14 and a divider 16 of the signal processing circuit so that it will not be affected by a change in signal intensity of the light source.

The output signal emerging from the first photodetector 9 is a composite signal containing not only a signal component indicative of a change in angle resulting from the displacement of the probe 6, but also a signal component indicative of a swaying motion of air and a signal component indicative of a vibration occurring in the optical system. On the other hand, the output signal emerging from the second photodetector 10 is a composite signal containing a signal component indicative of a swaying motion of air and a signal component indicative of a vibration occurring in the optical system.

Accordingly, the subtractor 17 of the signal processing circuit responds to the first and second composite signals respectively from the first and second photodetectors 9 and 10 to subtract the second composite signal from the first composite signal, thereby providing a displacement signal indicative of the displacement of the probe 6 that is not affected by any external disturbance such as the swaying motion of air and the vibration occurring in the optical system.

The surface profile of the sample 18 can then be determined by maintaining the displacement signal at a predetermined constant value, changing the position of the sample 18 in a transverse direction perpendicular to the probe 6 by means of the XYZ scanner 19 supporting the sample 18, and moving a surface of the sample 18 to be measured along a plane perpendicular to said transverse direction while the spacing between the sample 8 and the probe 6 is accurately kept at a distance on the order of a nanometer to a subangstrom.

Figure 2:
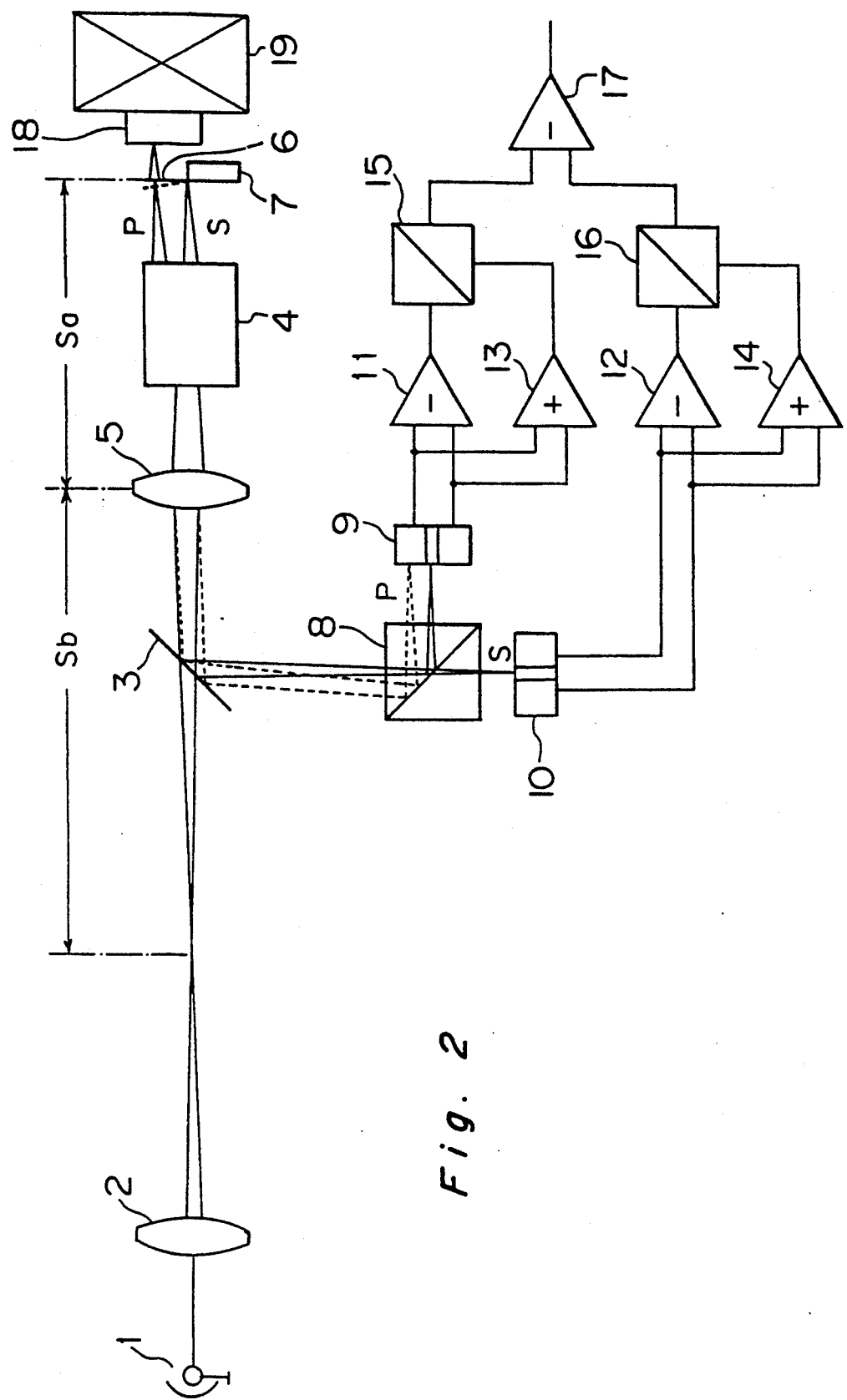
Figure 5:
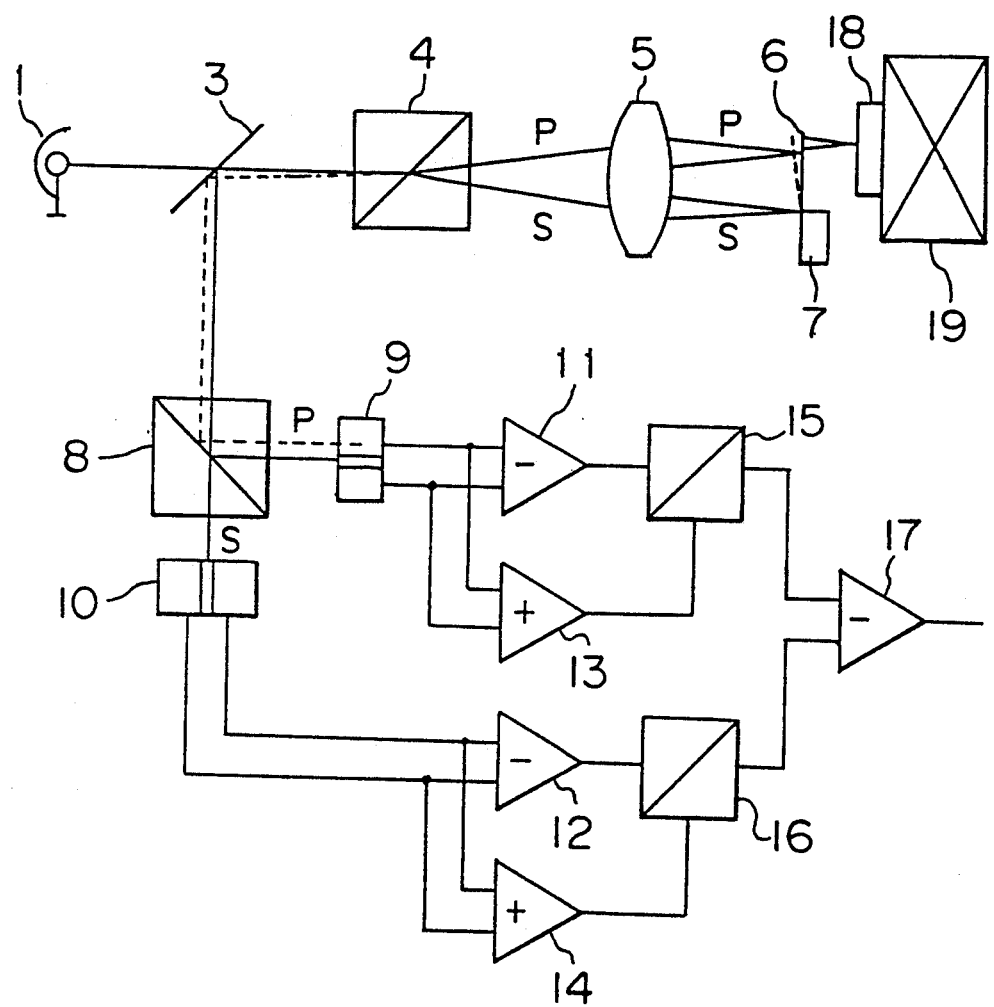
FIG. 5 is a schematic diagram showing the principle of operation of the prior art minute displacement measuring method.

In a second preferred embodiment of the present invention shown in FIG. 2, the prism 4 and the second convex lens 5 are reversed in position relative to that shown in FIG. 1 and the prism 4 in this second embodiment is employed in the form of a calcite prism although a Wallaston prism may also be employed therefor.

In a third preferred embodiment of the present invention shown in FIG. 3, the optical system shown therein is similar to that shown in FIG. 1 except that, in place of the first convex lens 2 shown in FIG. 1, a concave lens operable to diverge the rays of light from the light source 1 is employed.

In a fourth preferred embodiment shown in FIG. 4, the optical system shown therein is similar to that shown in FIG. 2, except for the first convex lens 2 shown in FIG. 2 is replaced with a concave lens operable to diverge the rays of light from the light source 1.

It is to be noted that the optical system shown in any one of FIGS. 2 to 4 operates in a manner similar to that shown in FIG. 1 and, therefore, the details thereof have not been reiterated for the sake of brevity.

Although the present invention has been described connection with the preferred embodiments thereof with reference to the accompanying drawings, it is to be noted that various changes and modifications are apparent to those skilled in the art. Such changes and modifications are to be construed as being included within the scope of the present invention as defined by the appended claims unless they depart therefrom.

What is claimed is:

1. A method of detecting a minute displacement of a probe which comprises:
   emitting from a laser source two laser beams having different polarizing directions;
   passing the laser beams through a first lens so as to cause the laser beams to diverge;
   passing the diverged laser beams through a beam splitter and then through a first prism having an angle of separation which varies depending on the direction of polarization of light, the beams passing through the first prism forming first and second measuring beams;
   passing the first and second measuring beams through a second lens so as to be focused on and subsequently reflected from a first reflecting surface provided in the vicinity of a tip of the probe and a second reflecting surface provided in the vicinity of a probe holder;
   passing the reflected first and second measuring beams through the second lens and the first prism towards the beam splitter;
   deflecting by means of the beam splitter the reflected first and second measuring beams in a direction diverging from a direction towards the laser source so as to enter a polarizing beam splitter operable to pass or reflect the rays of light depending on the direction of polarization of the light, said reflected first measuring beam being deflected by said polarizing beam splitter so as to enter a first photodetector and said reflected second measuring beam being passed through said polarizing beam splitter so as to enter a second photodetector;
   causing the first photodetector to detect a position of focus of the reflected first measuring beam and causing the second photodetector to detect a position of focus of the reflected second measuring beam; and
   processing respective output signals from the first and second photodetectors by the use of a signal processing circuit to measure the displacement of the probe.

2. A method of detecting a minute displacement of a probe which comprises:
   emitting from a laser source two laser beams having different polarizing directions;
   passing the laser beams through a first lens so as to cause the laser beams to diverge;
   passing the diverged laser beams through a beam splitter and then through a second lens and then through a first prism having an angle of separation which varies depending on the direction of polarization of light, the beams passing through the first prism forming first and second measuring beams;
   wherein the first and second measuring beams are focused by the second lens so as to be focused on and subsequently reflected from a first reflecting surface provided in the vicinity of a tip of the probe and a second reflecting surface provided in the vicinity of a probe holder;
   passing the reflected first and second measuring beams through the first prism and the second lens towards the beam splitter;
   deflecting by means of the beam splitter the reflected first and second measuring beams in a direction diverging from a direction towards the laser source so as to enter a polarizing beam splitter operable to pass or reflect the rays of light depending on the direction of polarization of the light, said reflected first measuring beam being deflected by said polarizing beam splitter so as to enter a first photodetector and said reflected second measuring beam being passed through said polarizing beam splitter so as to enter a second photodetector;
   causing the first photodetector to detect a position of focus of the reflected first measuring beam and causing the second photodetector to detect a position of focus of the reflected second measuring beam; and
   processing respective output signals from the first and second photodetectors by the use of a signal processing circuit to measure the displacement of the probe.

* * * * *